May 17, 1938. H. SALVATORI ET AL 2,117,365
SEISMIC SURVEYING
Filed Dec. 20, 1937   3 Sheets-Sheet 1

Inventors
Henry Salvatori
James N. Walstrum
Geo. L. Parkhurst
Attorney

Inventors
Henry Salvatori
James N. Walstrum
Attorney

May 17, 1938.  H. SALVATORI ET AL  2,117,365
SEISMIC SURVEYING
Filed Dec. 20, 1937   3 Sheets—Sheet 3

Inventors
Henry Salvatori
James N. Walstrum
BY *Geo. L. Parkhurst*
ATTORNEY

Patented May 17, 1938

2,117,365

UNITED STATES PATENT OFFICE 2,117,365

SEISMIC SURVEYING

Henry Salvatori and James N. Walstrum, Los Angeles, Calif., assignors to Western Geophysical Company, Los Angeles, Calif., a corporation of Delaware Application December 20, 1937, Serial No. 180,902

19 Claims. (Cl. 181—0.5)

The present patent application is a continuation-in-part of our copending patent application Serial No. 131,184, filed March 16, 1937.

This invention pertains to new and useful improvements in the art of seismic geophysical prospecting. More specifically, it relates to a method and means whereby correlation of data from reflection seismic surveys is facilitated. By use of this method, more complete and continuous surveying of sub-surface formations can be accomplished than was formerly possible.

The most accurate method of reflection seismic prospecting is the correlation survey. This method of surveying depends upon the ability of the surveyors to identify seismic reflections from the same sub-surface stratum on records taken at a number of different points in the same general area. The depth of the stratum is determined at the various points chosen. From these depths a sub-surface contour map can be drawn, just as a contour map of the surface of the ground can be drawn by running a line of levels across the region. It is obvious that there is an absolute necessity to identify the reflections from any one stratum throughout the region, as otherwise the depths obtained are for different strata and the results are erroneous. Where such identification is possible, a highly accurate survey can be made, because the depth of the formation can be determined from the records to within ten or twenty feet.

Usually an observer identifies reflections from the same bed on a number of records from different survey stations by noticing certain characteristic peculiarities of the reflections which are found on all the records. Thus, a reflected wave of unusually high amplitude appearing on the records can be identified as coming from a bed with good reflecting properties throughout the region. Other peculiarities are known, all of which are said to give "character" to a particular reflection, and which render the reflection recognizable on various records. Again, it may be possible to find a set of reflected waves which appear in a certain spaced sequence in the records, through which identification is possible. Experienced observers will take advantage of all these possibilities to correlate their records.

It is evident that correlation is facilitated if the reflecting beds are continuous throughout the region surveyed, as otherwise the characteristic reflections disappear on certain records. Thus, the usual method of correlation surveying is much more difficult, and often is absolutely impossible, in regions in which beds are discontinuous. Correlation surveying is also difficult in regions in which the beds change their lithologic character with distance, so that at one survey station a strong reflection is received from a certain bed, while only a weak reflection will be found from the same bed some distance away. Another situation which causes difficulty is that in which a large number of reflections of roughly the same amplitude are recorded at fairly uniform intervals, so that the identification of any one reflection on various records is virtually impossible. A second method of reflection surveying, known as the dip method, has been developed for use in such areas.

In using the dip method, emphasis is placed on the reflections obtained at each station. The depths and dips of the formations below the survey station are determined by computation from the records, in manners well known to the art. These depths and corresponding dips are plotted for each survey point, but no correlation of the reflections from one shot point to another is carried out. Contour lines can be drawn in, starting at any reflection horizon obtained at a station and following the dip of the bed until half way to the next station, at which point the dip is altered to that found at that depth at the second station. The general structure of the region and the slope of the beds can be determined, but the course of a particular bed can only be surmised. This is the gravest disadvantage in the method. Geological interpretation of the region is hampered, especially in petroliferous areas, where not only the general slope of the beds, but the continuity and depth of each bed is of importance. If faults occur between the survey stations, they will not be located since continuous coverage is not attempted. The dip method is also less accurate than the correlation method. Not only is the method of computation more difficult, allowing greater chances for error, but the assumptions made (such as neglecting the effect of refraction on the wave paths) produce a greater inherent error than is present in the correlation method.

An object of this invention is to furnish a method and means for carrying on continuous correlation surveying, even in regions with discontinuous beds, numerous reflections, changes in lithologic character of the beds giving weak reflections, or any other causes which would normally result in the abandonment of usual correlation methods. We are thus able to combine the advantages of both methods in one. A further object of our invention is to facilitate the survey of one or more beds throughout their extent in the region covered. A still further object of the invention is to provide a method by which faulting or discontinuance of beds can be determined readily. Another object of our invention is to provide a method for making a continuous uninterrupted survey of a sub-surface formation. Further objects, uses and advantages of our invention will become apparent as the description thereof proceeds.

The invention is illustrated by the accompanying drawings which form a part of this specification and are to be read in conjunction with it. In these drawings, the same reference symbols in different figures refer to corresponding features.

Figure 1:
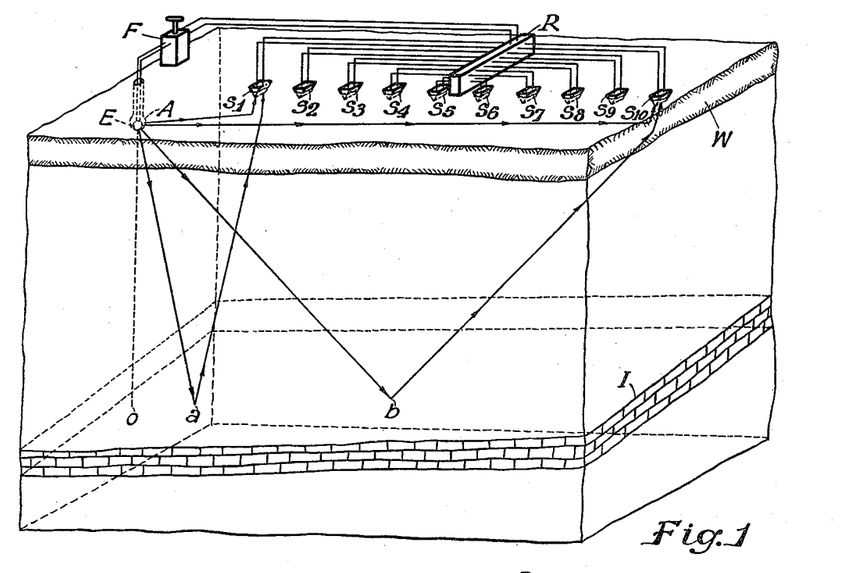
Figure 1 is an isometric diagram of an idealized section of the crust of the earth, showing typical geological sections, and illustrates the usual method known in the prior art for reflection seismic surveying.

In using the normal method of reflection seismic surveying, illustrated in Figure 1, the seismometers are placed on a line radially away from the shot hole, with the first seismometer some 200 to 600 feet from the hole. In this figure ten seismometers $S_1, S_2 \ldots S_{10}$ are shown, but any number might be used, depending upon the required accuracy of the survey. The distance between the first and last seismometer depends upon the steepness of the sub-surface beds, the required accuracy of survey, etc., and is usually of the order of 600 to 2000 feet. This distance is known as the "spread" of the seismometers. These seismometers are connected to a recorder R, which usually includes a multi-channel amplifier and a multi-element oscillograph. A charge of explosive E is detonated in shot hole A by means of firing box F, causing seismic waves to be generated, which radiate in all directions. The instant of detonation is impressed on the recorder R which is electrically coupled to the firing circuit.

Certain of the paths of the waves important in the following discussion have been drawn in Figure 1. The first waves to reach the seismometers are the refracted waves which travel along the top of the consolidated formation just below the weathered zone W, constantly being refracted upwards. Certain of the other waves are traveling downward striking discontinuities such as interface I, at points such as $a$ and $b$, and are reflected up to strike the seismometers, causing corresponding electric waves to actuate the oscillograph elements. By using a number of seismometers placed between the first and last instruments, the operator can check as to which of the waves arriving at the seismometers are reflected from substrata, the criterion being that reflected waves from a given substratum strike all the instruments nearly at the same time, due to the approximate equality of the lengths of paths traveled by reflected waves from the shot points to the various instruments. A refracted wave or surface wave strikes each seismometer in turn, considerable time elapsing between successive arrivals at the various instruments.

As is well known in the art, the depth and dip of a reflecting stratum can be computed from three quantities: the length of time taken for the waves reflected from the stratum to reach the seismometers, the slight difference in arrival times of reflected waves at the first and last seismometers, and the average velocity of the waves in the sub-surface strata. This last quantity is determined by other methods and will not be discussed further in this disclosure. The first two quantities are read directly from each record.

From Figure 1 it is obvious that all the reflected waves from this particular reflecting stratum which arrive at the seismometers strike the bed between points $a$ and $b$. Thus, this particular stretch is the only part of the stratum to be surveyed. If seismometer $S_1$ could be placed adjacent to the shot hole A, the region surveyed would extend over from point $o$ to point $b$, point $o$ being the projection of the shot point on the reflecting stratum. Unfortunately it is impossible to detect reflections on a record from a seismometer close to the shot hole. Field experience has shown very definitely that if the first seismometer is placed closer than approximately 200 feet from the hole, the heavy surface vibrations preclude all possibility of determining reflections. For this reason, there is no possibility of surveying the stretch between $o$ and $a$ by this system of reflection surveying.

This gap in the sub-surface survey is very disadvantageous in attempting to use correlation methods. It is obvious from what has been said that in general the only way one can be definitely sure of recognizing the reflections from the same stratum at all the seismometers is that the reflected wave arrives at, e. g., seismometer $S_5$ only a little later or earlier than at seismometer $S_6$, and so on down the line. Thus, the reflection can be "carried over" through the record throughout the whole seismometer spread. This can be seen easily by reference to a typical record such as Figure 3, in which the reflection can be followed from trace to trace. If there is a fault between the points $a$ and $b$, it will be shown up on the records in that the reflection can be carried over from instrument to instrument only to a certain point, at which point the reflecting stratum changes elevation abruptly. The reflection from that stratum appears at the rest of the instruments at a different time on the record. Thus, the fault can be identified by the inability to carry over the reflection through the whole spread of instruments. If there is brecciation at or near the fault, the reflection is not received at the instruments whose reflection point on the bed falls in the broken area.

Again, the only way that one can be definitely sure of recognizing the reflections from the same stratum on records from adjacent setups is that it is possible to carry over (or correlate) the same reflections on both records. However, when the seismometer spread is moved to the other side of the shot hole as in the usual practice, the ability to carry over the reflections is lost due to the gap between the reflection points corresponding to the distance from the shot hole to the first seismometer on each side of the shot hole. There is no longer a continuous survey of the reflecting stratum between point $a$, Figure 1, and the similar point corresponding to the position of the first seismometer on the opposite side of the hole. Even if a reflection is found on the new record at the time predicted from the dip, strike, and depth of the bed as calculated from the first record, there is no assurance whatever that this reflection is from the same bed. It is impossible to tell whether or not the dip of the bed has not changed abruptly somewhere in the gap, or whether faulting or bed termination has occurred in the same intervening distance.

As a result of this analysis it is possible to name the requirements which must be met by any method in which the reflections are to be carried over from one setup to the next. The instruments and shot holes must be in such a relation that (a) there are only relatively small distances between reflection points on any one bed, and (b) when changing from one shot hole to the next, there must be positive assurance that the reflections from the same bed can be definitely identified on the new records. The first condition has been discussed in the last paragraph. The second condition is connected with the first, and can also be easily demonstrated.

It might be considered possible to obtain a continuous survey of the bed shown in Figure 1, i. e., to close the gap between points $o$ and $a$, by moving the instruments after the region from $a$ to $b$ has been surveyed along the survey line to the left so that seismometer $S_{10}$ occupied the position formerly occupied by, say, $S_5$, digging a new shot hole a suitable distance from the new position of seismometer $S_1$, and taking a record. The reflection point from the new shot hole to the new position of $S_{10}$ would be near the point $a$, so that it would be assumed at first that the survey could be carried forward by this overlapping process. This is not true, however. It must be remembered that the only way that the reflection from that particular bed was carried forward from one instrument to the next was that the reflected wave appeared on the record from all the instruments at approximately the same time, i. e., the arrival times of the wave at the different instruments were nearly the same. When the position of shot hole and instruments is changed, the path of the reflected waves is also shifted. Thus, the path of a reflected wave from the new shot hole to the reflection point near $a$ to the new position of $S_{10}$ is much longer than either the path from shot hole A to $a$ to $S_1$ or from A to $b$ to $S_{10}$ in the original setup. For this reason, no arrival time of the wave reflected from this bed to the shifted instruments will be identical with the arrival time of the reflected wave from the same bed to any of the instruments in the original setup. This point is of extreme importance. It follows that positive identification of the reflection from record to record as the instrument setups are overlapped is impossible, due to this difference in arrival times of the reflected waves. One can assume with fair accuracy that certain reflections appearing at certain predicted points in the overlapping records are from the same stratum, but no assurance can be placed on the results obtained under such circumstances. Indeed, it has been proved by core drilling in regions difficult to survey that the reflections were not carried over satisfactorily in this way.

Definite identification of the reflections from one bed can be made from one record to another taken after the instruments have been moved or the shot hole changed, if the shot holes and seismometers are so arranged that the distance from shot hole to one seismometer is substantially the same for both records and the reflection point on the bed is substantially the same. This insures that the wave will travel substantially the same distance in both cases before reaching this particular seismometer, so that the arrival time of this wave as read off both records will be substantially identical. Then in each record the reflection can be carried over from this particular seismometer to others placed so that a continuous survey can be made. This principle is new and has not been employed heretofore to the best of our knowledge. It forms the principal basis of our invention.

Figure 2:
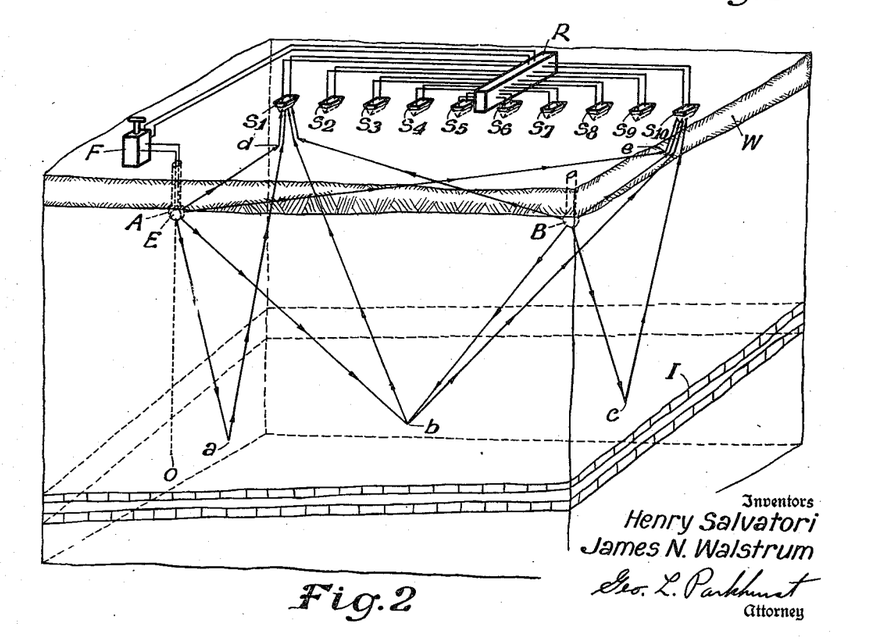
Figure 2 is an isometric diagram of the same section as Figure 1 showing one arrangement of equipment and shoe holes pertinent to this invention, and illustrates the method of our invention.

This is best understood by reference to Figure 2 in which the same section of the earth's crust shown in Figure 1 is reproduced. Shot holes A and B are drilled on a line roughly parallel to the survey line and at a distance from it. The shot holes are preferably 1000 to 2000 feet apart and the survey line may be 100 to 300 feet from the shot hole line, although different distances may be employed at the will of the surveyor. The seismometers are placed on the survey line, the number and spacing depending upon the required accuracy of the survey. We prefer to use a spread of at least six seismometers. One seismometer is placed opposite each of the two shot holes. The instruments are preferably of the type producing electric impulses as a result of seismic disturbances, and are connected to a recorder R which may suitably contain a multi-channel amplifier and some sort of multi-element oscillograph. Records are made of the seismic disturbance along the line of instruments for a charge of explosive detonated in each shot hole. The instant of detonation of the explosive is impressed on each record by means already well known to the art.

Figure 3:
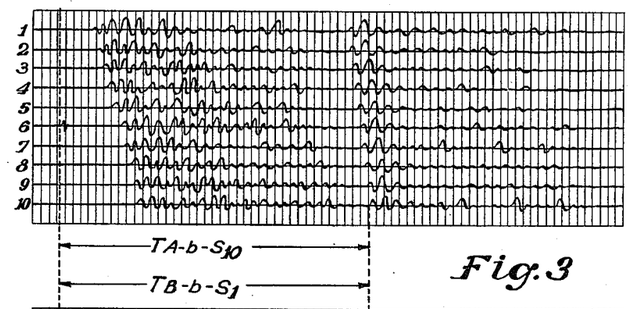
Figures 3 and 4 represent typical records from the seismometers shown in Figure 2 for shots in holes A and B respectively.
Figure 4:
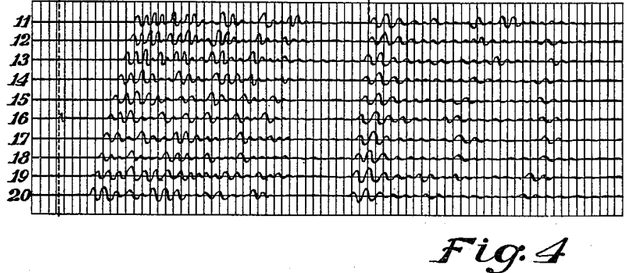

Typical records which are obtained from this arrangement are shown in Figures 3 and 4. Figure 3 represents the waves received as a result of a shot in hole A and Figure 4 gives the results for a shot in hole B (firing box F being moved to hole B for this purpose). On these records the transverse lines are timing marks printed on the record at convenient intervals, say 0.01 second. Of course other timing methods can be used. In these records traces I and II are responsive to impulses from seismometer $S_1$, traces 2 and 12 are from seismometer $S_2$, etc. The time-breaks giving the instants of detonation for each record (shown on traces 6 and 16) have been aligned in order that the arrival times of the various waves can be compared more easily. The first large amplitude waves on each record are due to the refracted waves traveling paths such as A—$d$—$S_1$ and A—$e$—$S_{10}$. Only one reflection has been shown on each record, corresponding to the single reflecting discontinuity shown in Figure 2. Obviously these records have been enormously simplified to illustrate the principles involved; the records obtained in regions difficult to survey contain the same information but are very much harder to interpret than these examples.

From the record shown in Figure 3 a survey of the depth and dip of the discontinuity I from reflecting points $a$ to $b$ can be made. Similarly, from the record of Figure 4 a survey can be made from points $b$ to $c$. The important factor, however, is that since the reflection points of the waves from A to $S_{10}$ and B to $S_1$ respectively are coincident for all practical purposes, the travel time $T_{A-b-S_{10}}$ of the wave from A to the reflection point to S is equal to the travel time $T_{B-b-S_1}$ of the wave from B to the reflection point to $S_1$. This follows because the lengths of the two paths A—$b$—$S_{10}$ and B—$b$—$S_1$ are identical, within practical limits. An example will make this evident.

Assume the survey line to lie East-West, and the strike of the dipping bed to be N 45° E (worst possible strike angle). The distance from $S_1$ to $S_{10}$ is 1000 feet, and the line of shot holes is 200 feet from the seismometer line. The dip of the bed is assumed to be 30°, which is a very steep dip, seldom encountered. The difference in lengths of the two reflecting paths A—$b$—$S_{10}$ and B—$b$—$S_1$ is only 25 feet when the bed is 1000 feet below the surface, and 5 feet when the bed is 5000 feet down. The time differences on the two records corresponding to these differences in length will depend on the seismic wave velocity. Assigning this a common value of 7000 feet per second, the time difference in the first case is only 0.0036 second and 0.0007 second in the second case. This demonstrates that even under such severe circumstances no difficulty would be encountered in correlating the two reflections indicated.

In the analysis given just above, one factor has been neglected. If the depth of the weathered zone beneath seismometers $S_1$ and $S_{10}$ is not the same, the travel time $T_{A-b-S_{10}}$ will be slightly different from travel time $T_{B-b-S_1}$, since the velocity of the seismic waves in this zone is much lower than in the consolidated beds. Thus a ten foot difference in the thickness of this zone, in which the velocity is usually found to be about 2000 feet per second, would cause a time difference in the two arrival times of $$10 \left( \frac{1}{2000} - \frac{1}{7000} \right)$$

or 0.00357 second, in the example given. However, this time interval or "weathering correction", can be quite accurately determined using this method, as will be described later. The computer can take this factor into account when correlating the waves, and eliminate any possible error due to this cause. Differences in elevation of the correlation seismometers can be accounted for in much the same manner.

In continuous surveying, the method is pursued as follows: A shot is detonated in hole A and a record, such as Figure 3, is made of the resulting seismic waves at the seismometers $S_1$—$S_{10}$. From this record the sub-surface is surveyed for depth and dip from reflection point $a$ to reflection point $b$. Then, a shot is detonated in hole B, and a record such as Figure 4 produced. These two records are then compared carefully in order to find on the second record the reflections corresponding to those encountered on the first record. The comparison, of course, is between the trace of seismometer $S_{10}$ for the shot in hole A and the trace of seismometer $S_1$ for the shot in hole B. This correlates the two records and permits extending the survey of this same bed between reflection points $b$ and $c$. Now the seismometer spread is moved along the survey line until instrument $S_1$ is at the position formerly occupied by instrument $S_{10}$. The seismometers are now arranged to correspond with positions $S_{10}$—$S_{19}$ of Figure 5. Another shot is detonated in hole B, and a record made. On this record, the trace of seismometer $S_1$ in the new position $S_{10}$ will show the reflections identically at the same times as the trace of $S_{10}$ in the original position for the first shot at B, because the positions of the instruments are, of course, the same with reference to the shot hole, and the reflection points are identically placed at $c$. This correlates the new record with the one shown in Figure 4, and the reflection points can be determined from $c$ to the right (Figures 2 and 5), just as originally points $a$ to $b$ were found. The next shot is at C in Figure 5 using seismometer positions $S_{10}$—$S_{19}$, then at C using seismometer positions $S_{19}$—$S_{28}$, then at D using seismometer positions $S_{19}$—$S_{28}$, etc. Each record can be correlated with the preceding one since there is always an identical wave path (B—$c$—$S_{10}$, C—$c'$—$S_{19}$, or D—$c''$—$S_{28}$) or a pair of equivalent wave paths (those through reflection points $b$, $b'$ and $b''$) which permit the identification on the records of reflections from the same bed. Thus, correlation of the records can be made each time the shot point or the line of seismometers is moved, giving continuous correlation surveying of the sub-surface strata.

There are several alternative ways in which the same method of correlation can be used. Another which can be used is as follows: The line of seismometers is placed parallel to the line of shot holes, but the spread is arranged so that the first instrument is opposite one shot hole, the middle instrument is opposite the second shot hole and the last instrument is opposite the third shot hole. The arrangement can be described by reference once more to Figure 5. Using a spread of seismometers $S_1$—$S_{19}$, a charge of explosive is detonated in shot hole B opposite the middle seismometer, and records made in the usual manner. After all necessary records have been obtained, the instrument spread is moved along the survey line the distance between shot holes, so that the middle instrument occupies the position occupied formerly by one end seismometer. The spread now occupies positions $S_{10}$—$S_{28}$. Records are again taken for waves produced by detonation of an explosive charge in shot hole C. This process is repeated throughout the survey.

In correlating the records obtained using the various shot holes, the reflection record corresponding to a shot at B and reception at $S_{19}$ is compared with the reflection record for a shot at C and reception at $S_{10}$. It is evident by inspection of Figure 5 in light of the previous paragraphs that the reflection points on the various reflecting strata will be practically identical for reflected waves received at these stations from the holes mentioned. Moreover, wave path B—$b'$—$S_{19}$, as we have seen before, is substantially equal in length to wave path C—$b'$—$S_{10}$. This arrangement of instruments illustrates the fact that the location of the seismometers is not limited to the portion of the survey line lying between points opposite the two shot holes, but may be extended on either side. The connection of the sesimometers illustrated to the amplifier-recorder is not shown in Figure 5 as the usual arrangement has been adequately illustrated in Figure 2.

Figure 6:
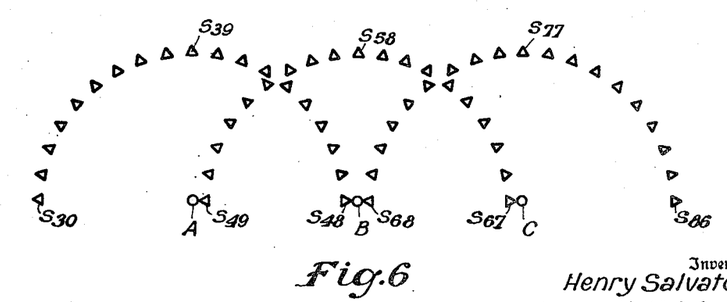
Figure 6 is a diagrammatic plan view showing an alternative arrangement.

Still another arrangement which can be employed in connection with our invention is shown in Figure 6. Here the seismometers have been so positioned that the end instruments are roughly on the line of shot holes. The other instruments have been placed in such manner that there is only a small interval between the reflection points on the sub-surface beds, so that any reflection can be carried over from $S_{30}$ to $S_{48}$ by means of the intervening seismometers. After the records have been taken for shots at A, the instruments are moved to occupy positions $S_{49}$—$S_{67}$ with seismometer $S_{49}$ preferably only a few inches from shot hole A and seismometer $S_{67}$ further down the survey line. Correlation between records taken at adjacent holes is secured because the reflection point for waves from A to $S_{48}$ is the same as the reflection point for waves from B to $S_{49}$. Moreover, the wave paths are of equal length and thus the two necessary conditions are fulfilled. This setup is quite flexible, as no requirement is made for the absolute positioning of any but the end seismometers. The end instruments need not be equidistant from the shot point. The instruments can be arranged along the arc of a circle or ellipse, along two intersecting straight lines, or on an irregular curve so long as they are arranged in a continuous chain connecting the two end seismometers. The spacing between adjacent seismometers should be much less than, preferably not more than half, the distance from the nearest seismometer to the shot hole with which it is used.

Figure 5:
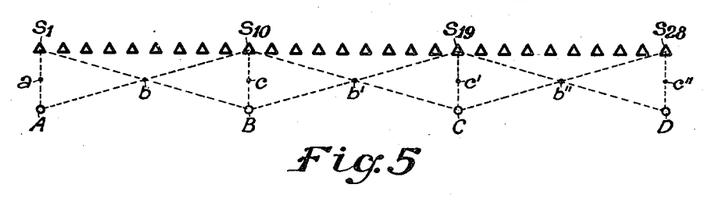
Figure 5 is a plan view showing in diagrammatic fashion the arrangement of seismometers and shot holes used in practicing my invention.

A special advantage of the Figure 6 modification of our method is that by its use it is possible to avoid some obstruction in the terrain preventing lining up the instruments as in Figure 5. However, more cable is required for this type of setup, which is a considerable disadvantage.

It is obvious from the preceding paragraphs that the warping of the beds cannot affect the ability to correlate all records. If faulting occurs, it is immediately revealed by the absence of the reflection on certain traces on which it should come in. Thus, this method possesses great advantages over all previous methods used to survey the sub-surface strata in highly warped or faulted regions.

Occasionally this method proves advantageous from another cause. In making seismic surveys along a certain survey line, it is not always possible to secure permission from owners to detonate on their property the small explosive charges required. Under such conditions, this method can be used by placing the seismometers along the survey line through the property, and digging the shot holes on adjacent property. The validity of the survey is still preserved.

While it is desirable that the lengths of reflected wave paths for the correlation traces be as nearly equal as possible and that the reflection points for the correlation traces be as nearly identical as possible it will be apparent that some latitude in these matters can be allowed without departing from the spirit of our invention. One of many possible examples of this is illustrated in Figures 7 and 8.

Figure 7:
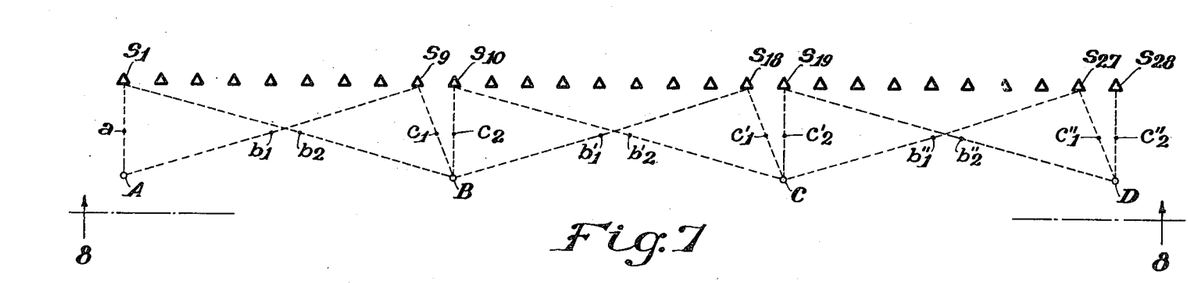
Figure 7 is a diagrammatic plan view corresponding to Figure 5 but illustrating a slight variation of the method and apparatus illustrated thereby.

Figure 7 corresponds to Figure 5 except that nine seismometers are used at a time instead of ten as preferred in the method of Figure 5. In operating in accordance with Figure 7, seismometers $S_1$—$S_9$ are used for shots at A and B, seismometers $S_{10}$—$S_{18}$ are used for shots at B and C, seismometers $S_{19}$—$S_{27}$ for shots at C and D, etc.

Figure 8:
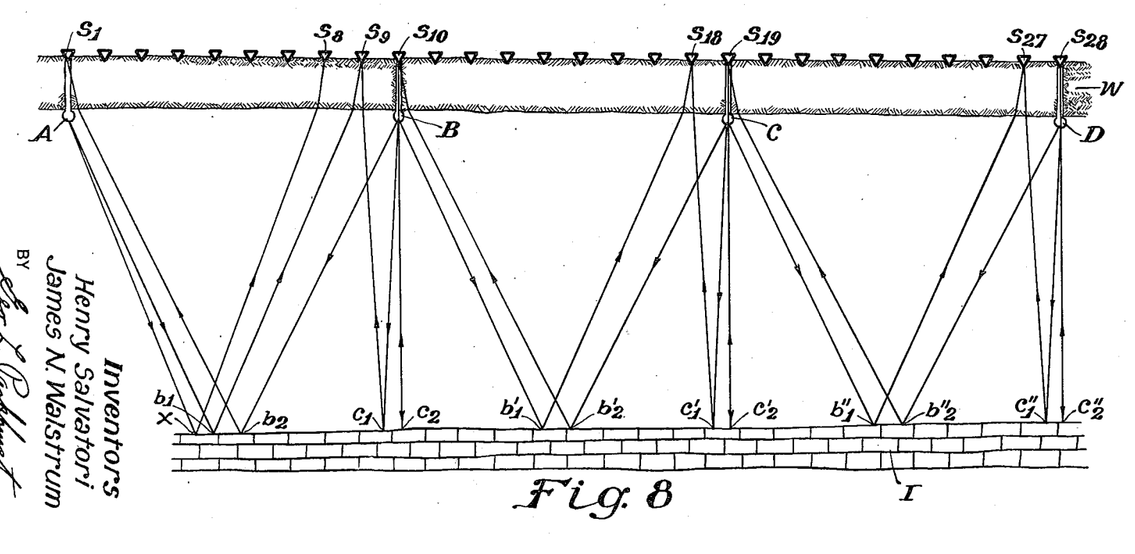
Figure 8 is a vertical section through the earth's crust taken along the line 8—8 of Figure 7.

The correlation wave paths are illustrated in Figures 7 and 8. Reflection point $b$ of Figure 5 becomes two slightly separated reflection points $b_1$ and $b_2$ in Figures 7 and 8. Similarly reflection point $c$ becomes $c_1$ and $c_2$, $b'$ becomes $b_1'$ and $b_2'$, $c'$ becomes $c_1'$ and $c_2'$, $b''$ becomes $b_1''$ and $b_2''$, $c''$ becomes $c_1''$ and $c_2''$, etc. The lengths of the correlation wave paths are likewise varied to some extent. However, the variation both as to reflection points and lengths of paths is so small that correlation is still possible and the advantages of our invention are, for the most part, preserved.

In general it may be said that successive setups, or arrangements of shot hole and seismometers, should be so laid out that the length of reflected wave path corresponding to a reflection from a given underlying reflecting structure shown on one trace on a record made using one setup is substantially identical with the length of reflected wave path corresponding to a reflection from the same underlying reflecting structure shown on one trace on a second record made using the next setup and so that the reflection points on the underlying reflecting structure for the two reflected wave paths are not substantially further apart than the maximum spacing for reflection points on the same structure for wave paths corresponding to any two adjacent traces on either of the two records. Although with some slight sacrifice of accuracy, the reflection points for the correlation traces can be as much as twice the maximum spacing of reflection points for adjacent traces on a single record. Thus, for example, in Figures 7 and 8 wave paths B—$c_1$—$S_9$ and B—$c_2$—$S_{10}$ are substantially identical in length or in other words are so nearly the same length that the corresponding reflections on the correlation traces can be identified readily because they come in within a small fraction of a second of the same time interval after the firing of the respective shots. As an example of the reflection point requirement, reflection points $b_1$ and $b_2$ for the correlation traces (Figure 8) are not more than twice the spacing between reflection points $x$ and $b_1$ for adjacent traces on a single record.

Another advantage inherent in our invention is the ease with which weathering corrections can be obtained. The "weathering correction", already given brief mention, is the difference in time for reflected waves to penetrate the weathered zone immediately below the first and last seismometers, due to a difference in thickness of this zone. It is important that this difference be determined accurately. A number of methods for determining the weathering correction in normal shooting practice are known. In this particular case, the weathering correction can be obtained from the refraction parts of the records, so that no special setups, extra explosive, etc., are required. Referring again to Figure 2, it will be seen that the first refracted wave reaching seismometer $S_{10}$ from an explosion in shot hole A travels the path A—$e$—$S_{10}$ of which the portion A—$e$ is at the top of the unweathered zone, and $e$—$S_{10}$ is substantially a vertical path through the weathered formation. Similarly, the first refracted wave reaching seismometer $S_1$ from an explosion in shot hole B travels path B—$d$—$S_1$, of which B—$d$ is in the unweathered zone and $d$—$S_1$ is the thickness of the weathered zone at $S_1$. The paths A—$e$ and B—$d$ are almost exactly the same and the time taken to traverse them can be considered to be the same. Thus, the difference in time for the first wave to reach $S_{10}$ from A and the first wave to reach $S_1$ from B is due to the difference in the thickness of the weathered zone beneath the two seismometers and is the weathering correction.

A point which is quite important in practice should be brought up in connection with this way of determining the weathering correction. It might be thought that the weathering correction could be determined just as easily by taking the difference between the first arrivals of the refracted waves from A at $S_1$ and from B at $S_{10}$ as by the method given above. Practically, this is often found to be untrue. Since the two paths A—d and B—e are quite separate and fairly far apart, a local increase in thickness of weathering or a lack of homogeneity at the top of the consolidated region found between A and d may not extend to the path B—e, so that these two paths may be of quite different lengths. The computed weathering correction will be incorrect if this is the case, because that computation is made using the assumption that the lengths of the paths in the high speed media are equal. On the other hand, it would have to be a very small local increase in weathering thickness or lack of homogeneity causing an increase in one of the crossed paths A—e or B—d that would not cause the same increase in length of the other path, since the two paths cover very nearly the same territory. Field tests have shown that this crossed path method of weathering correction is highly reliable.

No special arrangement or spacing of the seismometers used in our new method is necessary, except as above set forth, and the number of instruments used depends on the accuracy of the survey and degree of warping of the underground beds. The line of seismometers need not terminate opposite the shot holes but can be carried beyond in order to check the records more closely. Other arrangements may be found advantageous, as will be apparent to those skilled in the art. It is therefore to be understood that we do not limit ourselves to the specific forms or number of apparatus to be used, but only to the scope of the appended claims which should be construed as broadly as the prior art will permit.

We claim:

1. The method of profiling at least one subsurface stratum which comprises producing seismic waves at a first source, receiving seismic waves from said first source after reflection from said stratum at two or more reception points spaced from said source and out of line therewith, recording the effects of said seismic waves as a plurality of traces on a common record; producing seismic waves at a second source spaced from said first source and out of line with said reception points, receiving seismic waves from said second source after reflection from said stratum at said reception points, and recording the effects of said last-mentioned seismic waves as a plurality of traces on a second common record, the length of the reflected wave path between said first source and one of said reception points being substantially the same as the length of the reflected wave path between said second source and the other of said reception points, and said two reflected wave paths having substantially identical reflection points on said subsurface stratum.

2. The method of claim 1 in which a line drawn from said first source to said second source is substantially parallel to but spaced substantially from a line drawn through said reception points.

3. The method of profiling at least one subsurface stratum which comprises producing seismic waves at a first source, receiving seismic waves from said first source after reflection from said stratum at a plurality of reception points spaced from said source and out of line therewith, recording the effects of said seismic waves as a plurality of traces on a common record; producing seismic waves at a second source spaced from said first source, receiving seismic waves from said second source after reflection from said stratum at said plurality of reception points, and recording the effects of said last-mentioned seismic waves as a plurality of traces on a second common record, the length of the reflected wave path between said first source and one of said plurality of reception points being substantially the same as the length of the reflected wave path between said second source and another of said plurality of reception points, the reflection points on said stratum for said two reflected wave paths being sufficiently close together to assure accurate correlation between said two records.

4. The method of profiling at least one subsurface stratum which comprises producing seismic waves at a first source, receiving seismic waves from said first source after reflection from said stratum at a plurality of reception points spaced from said source and out of line therewith, recording the effects of said seismic waves as a plurality of traces on a common record; producing seismic waves at a second source spaced from said first source and out of line with said reception points, receiving seismic waves from said second source after reflection from said stratum at a second plurality of reception points spaced from said first plurality of reception points, recording the effects of said last-mentioned seismic waves as a plurality of traces on a second common record, the length of the reflected wave path between said first source and one of the reception points used therewith being substantially the same as the length of the reflected wave path between said second source and one of the reception points used therewith, and said two reflected wave paths having substantially identical reflection points on said stratum.

5. The method of profiling at least one subsurface stratum which comprises producing seismic waves at a first source, receiving seismic waves from said first source after reflection from said stratum at a plurality of reception points spaced from said source and out of line therewith, recording the effects of said seismic waves as a plurality of traces on a common record; producing seismic waves at a second source spaced from said first source and out of line with said reception points, receiving seismic waves from said second source after reflection from said stratum at a second plurality of reception points spaced from said first plurality of points, recording the effects of said last-mentioned seismic waves as a plurality of traces on a second common record, the length of the reflected wave path between said first source and one of the reception points used therewith being substantially the same as the length of the reflected wave path between said second source and one of the reception points used therewith, the reflection points on said stratum for said two reflected wave paths being sufficiently close together to permit accurate correlation between said two records.

6. A method of continuous profiling using a line of spaced seismic wave generating stations and a substantially parallel spaced line of seismic wave receivers, comprising, generating seismic waves at one of said seismic wave generating stations, receiving reflected seismic waves at a plurality of said seismic wave receivers, recording the effects of said received seismic waves as a plurality of traces on a common record, generating seismic waves at a second of said seismic wave generating stations, receiving reflected seismic waves at the aforementioned plurality of seismic wave receivers, recording the effects of said last-mentioned seismic waves as a plurality of traces on a second common record, the distance from the first seismic wave generating station to one of the seismic wave receivers used therewith being substantially the same as the distance from the second seismic wave generating station to another of said receivers.

7. A method according to claim 6 in which said parallel lines are from about 100 feet to about 300 feet apart.

8. A method according to claim 6 in which said seismic wave generating stations are at least about 1000 feet apart.

9. A method of continuous profiling using a line of spaced seismic wave generating stations and a substantially parallel spaced line of seismic wave receivers, comprising, generating seismic waves at one of said seismic wave generating stations, receiving reflected seismic waves at a plurality of said seismic wave receivers, recording the effects of said received seismic waves as a plurality of traces on a common record, generating seismic waves at a second of said seismic wave generating stations, receiving reflected seismic waves at the aforementioned plurality of seismic wave receivers, recording the effects of said last-mentioned seismic waves as a plurality of traces on a second common record, the distance from the first seismic wave generating station to one of the seismic wave receivers used therewith being substantially the same as the distance from the second seismic wave generating station to another of said receivers, generating seismic waves at said second seismic wave generating station, receiving reflected waves at a second plurality of said seismic wave receivers, said second plurality of seismic wave receivers including one seismic wave receiver located at or near the position of one of the seismic wave receivers of said first plurality of seismic wave receivers, at least some of the remainder of the seismic wave receivers of said second plurality of seismic wave receivers extending from said first plurality of seismic wave receivers in the same direction which said second seismic wave generating station is from said first seismic wave generating station, and recording the effects of said last-mentioned seismic waves as a plurality of traces on a third common record.

10. A method of reflection seismic surveying using a series of spaced shot holes arranged in line with each other and a series of seismometer spreads arranged in general along a line paralleling the line of shot holes but spaced therefrom, comprising, generating, receiving and recording seismic waves using one of said shot holes and an adjacent seismometer spread, and repeating this operation progressing down the lines of shot holes and seismometer spreads moving from one shot hole to the next and from one seismometer spread position to the next, each progressive step maintaining a wave path equivalent to that of the preceding step, whereby correlation can be accomplished readily.

11. A method according to claim 10 in which said parallel lines are from about 100 feet to about 300 feet apart.

12. A method according to claim 10 in which seismic waves are generated below the bottom of the weathered formation.

13. A method of reflection seismic surveying comprising establishing two spaced seismic wave generating stations at depths at least as low as the bottom of the weathered formation, placing at least two seismometers on a line parallel to a line through said seismic wave generating stations, and positioned so that there is a seismometer opposite each of said seismic wave generating stations, generating seismic waves at one of said seismic wave generating stations, recording the instant of generation of said seismic waves, recording the arrivals of the refracted waves and waves reflected from subsurface discontinuities at said seismometers, and repeating the operation using the second of said seismic wave generating stations without substantially altering the positions of said seismometers, whereby the dip and depth of said subsurface discontinuities can be determined accurately.

14. A method of reflection seismic surveying comprising establishing a seismic wave generating station, establishing two seismic wave receivers arranged substantially on opposite sides of said seismic wave generating station and a continuous chain of spaced seismic wave receivers connecting said two first-mentioned seismic wave receivers, generating seismic waves at said generating station, receiving reflected seismic waves at said seismic wave receivers, recording the effects of the reflected seismic waves thus received, establishing a new seismic wave generating station adjacent the position of one of said two seismic wave receivers, establishing a new seismic wave receiver position adjacent the position of the first mentioned seismic wave generating station, another new seismic wave receiver position on the opposite side of said new seismic wave generating station, and a continuous chain of new spaced seismic wave receiver positions connecting said two new seismic wave receiver positions, placing seismic wave receivers at all of said new seismic wave receiver positions, generating seismic waves at said new generating station, receiving reflected seismic waves at the newly positioned seismic wave receivers, and recording the effects of the reflected seismic waves thus received.

15. A method according to claim 14 in which the spacing between adjacent seismic wave receivers in each of said chains is substantially less than the distance from any seismic wave receiver to the seismic wave generating station used therewith.

16. A method according to claim 14 in which the spacing between adjacent seismic wave receivers in each of said chains is not more than half the distance from any seismic wave receiver to the seismic wave generating station used therewith.

17. A method of obtaining data for a weathering correction in seismic surveying comprising arranging two seismometers at two adjacent corners of a substantially rectangular quadrilateral, generating a seismic wave at a point the vertical projection of which is at another corner of said quadrilateral, recording the effects of received refracted seismic waves at the seismometer located at the diagonally opposite corner of said quadrilateral, generating a seismic wave at a point the vertical projection of which is at the remaining corner of said quadrilateral, and recording the effects of received refracted seismic waves at the seismometer located at the diagonally opposite corner of said quadrilateral.

18. A method of obtaining data for a weathering correction in seismic surveying comprising arranging two seismometers at two adjacent corners of a substantially rectangular quadrilateral, generating a seismic wave slightly beneath the weathered layer at a point the vertical projection of which is at another corner of said quadrilateral, recording the effects of received refracted seismic waves at the seismometer located at the diagonally opposite corner of said quadrilateral, generating a seismic wave slightly beneath the weathered layer at a point the vertical projection of which is at the remaining corner of said quadrilateral, and recording the effects of received refracted seismic waves at the seismometer located at the diagonally opposite corner of said quadrilateral.

19. A method according to claim 18 in which said quadrilateral is long and narrow and in which the line connecting the two seismometers constitutes one long side thereof.

HENRY SALVATORI.
JAMES N. WALSTRUM.

DISCLAIMER 2,117,365.—*Henry Salvatori* and *James N. Walstrum*, Los Angeles, Calif. SEISMIC SURVEYING. Patent dated May 17, 1938. Disclaimer filed December 27, 1939, by the assignee, *Stanolind Oil and Gas Company*.

Hereby enters this disclaimer to claims 1 to 13 inclusive, of said patent.

[*Official Gazette January 30, 1940.*]